United States Patent
Rinklake et al.

[11] Patent Number: 6,119,415
[45] Date of Patent: Sep. 19, 2000

[54] PITCHED ROOF WITH AN ENERGY COLLECTION SYSTEM

[75] Inventors: Manfred Rinklake, Gross-Umstadt; Norbert Rösler, Oberursel, both of Germany

[73] Assignee: Braas GmbH, Oberursel, Germany

[21] Appl. No.: 09/172,589

[22] Filed: Sep. 29, 1998

Related U.S. Application Data

[63] Continuation-in-part of application No. PCT/DE97/00648, Mar. 27, 1997.

[30] Foreign Application Priority Data

Mar. 29, 1996 [DE] Germany .................... 196 12 489

[51] Int. Cl.⁷ .................................................. E04D 13/18
[52] U.S. Cl. ........................... 52/173.3; 52/518; 52/547; 52/551
[58] Field of Search ................... 52/173.3, 518, 52/543, 544, 547, 549, 550, 551, 552

[56] References Cited

U.S. PATENT DOCUMENTS

| | | | |
|---|---|---|---|
| 4,040,867 | 8/1977 | Forestieri et al. | |
| 4,914,885 | 4/1990 | Baker et al. | 52/547 X |
| 4,936,063 | 6/1990 | Humphrey | 52/200 |
| 5,409,549 | 4/1995 | Mori | 52/173.3 X |
| 5,437,735 | 8/1995 | Younan et al. | 52/173.3 X |
| 5,553,434 | 9/1996 | Tamura | 52/551 X |
| 5,651,837 | 7/1997 | Ohtsuka et al. | 52/173.3 X |
| 5,729,947 | 3/1998 | Dawes | 52/549 X |
| 5,740,996 | 4/1998 | Genschorek | 52/173.3 X |
| 5,746,839 | 5/1998 | Dinwoodle | 52/173.3 X |

FOREIGN PATENT DOCUMENTS

| | | |
|---|---|---|
| 0549560 | 6/1993 | European Pat. Off. . |
| 2354430 | 1/1978 | France . |
| 3314637 | 11/1983 | Germany . |
| 9209228 | 12/1992 | Germany . |
| 9409453 | 9/1994 | Germany . |
| 4332873 | 3/1995 | Germany . |
| 19529351 | 8/1995 | Germany . |
| 4408508 | 9/1995 | Germany . |

*Primary Examiner*—Richard Chilcot
*Attorney, Agent, or Firm*—Nils H. Ljungman & Associates

[57] ABSTRACT

A solar energy collection system for a pitched roof covered with roofing plates, with support elements that can be laid in the ridge-eaves direction. The support elements can be laid overlapping one another in the ridge-eaves direction, whereby plate-shaped modules having cells are located on the joist elements butted up against one another or adjacent to neighboring roof covering plates. The length of which modules can be greater than the greatest coverage length of a roofing plate, and the width of which can be greater than the system coverage width of the roofing plate.

23 Claims, 11 Drawing Sheets

PITCHED ROOF WITH AN ENERGY COLLECTION SYSTEM

CONTINUING APPLICATION DATA

This application is a Continuation-In-Part application of International Application No. PCT/DE97/00648, filed on Mar. 27, 1997, which claims priority from Fed. Rep. of Germany Patent Application No. 196 12 489.1, filed on Mar. 29, 1996. International Application No. PCT/DE97/00648 was pending as of the filing date of the present U.S. application and the U.S. was an elected state in the International Application No. PCT/DE97/00648.

BACKGROUND OF THE INVENTION

1. Field of the Invention

This present invention generally relates to a solar energy collection system for a pitched roof covered with roofing plates, with joist elements that can be laid in the ridge-eaves direction, which joist elements can be laid overlapping one another in the ridge-eaves direction, whereby plate-shaped modules having cells are located on the joist elements butted up against one another or adjacent to neighboring roof covering plates, the length of which modules can be greater than the greatest coverage length of a roofing plate, and the width of which can be greater than the system coverage width of the roofing plate.

2. Background Information

Such a system is described in German Patent No. 94 09 453.9 U1, for example. In this system, modules are arranged so that they overlap one another in the longitudinal direction of the roof. In this specification, the longitudinal direction is called the ridge-eaves line, and the transverse direction is designated a line parallel to the ridge or to the eaves. As the joist elements, there are wooden profiles laid in the ridge-eaves direction which, on their ridge-side end, are in contact with a roof batten and on their eaves-side end are in contact with a wooden batten that is laid parallel to a roof batten and adjacent to the latter. The wooden batten projects beyond the upper edge of the roof batten by approximately the thickness of the module. The wooden profiles, on their surface, have a depression that runs in the longitudinal center, so that this depression, when located on the edges of two modules butted against one other, serves as a drain channel for the discharge of any water that may have penetrated into the gap. One disadvantage of this system is that additional wooden battens must be laid parallel to the roof battens, and that additional stays that are engaged around the eaves-side edge of the modules are necessary for fastening.

A energy collection system for a pitched roof covered with roofing plates is described in EP-A-0 549 560. The system has frame-like joist elements that can be laid overlapping in the ridge-eaves direction. A plate-shaped module having cells can be inserted into each joist element, whereby the length of the module is greater than the greatest coverage length of a roofing plate, and the width of which is greater than the system coverage width of a roofing plate.

The lateral longitudinal edges of a joist element are realized in the conventional manner for a roofing plate in the form of water channels or bottom baffles and cover channels or top baffles. In this manner, joist elements and roofing plates can be laid in a row parallel to the eaves so that a joist element, with its lateral longitudinal edge which is realized in the form of a cover channel, always covers the lateral longitudinal edge of the neighboring joist element or of the neighboring roofing plate which is realized in the form of a water channel. On the system of the known art, it is not possible to install the modules with butt joints.

FR-A-2 354 430 describes a module that has an eaves-side segment with solar cells and a ridge-side segment that does not have any solar cells. The modules can be laid so that they overlap one another in the ridge-eaves direction, whereby a module is in contact with its ridge-side segment directly on a roof batten that runs in the direction parallel to the ridge, and is covered by the ridge-side segment with the solar cells of the higher module in the ridge-eaves direction. With the ridge-side segment, each module is supported on the segment that does not have the solar cells on the lower module in the ridge-eaves direction. The modules are not fixed to the roof batten on the ridge side, so that on each roof batten there is a hook that is engaged around the ridge-side each of a roof batten and the ridge-side edge of an overlapped module. The hook is inserted between the overlapping modules and is engaged around the eaves-side edge of the overlapping module. In this manner, the hook prevents the displacement of the overlapping module toward the eaves.

OBJECT OF THE INVENTION

The object of the invention is to create a solar energy collection system of the type described above that can be integrated in the form of a modular system into a roof covering consisting of small-format roofing plates, and one that can also be installed into an already-covered roof essentially without requiring any adaptation work, and also makes it possible to replace modules without the need to perform any installation work on the fastening system.

SUMMARY OF THE INVENTION

The present invention teaches that this object can be accomplished by providing, on the joist element, a support or lug which, when two joist elements are located in the same slope line, supports the adjacent end of the ridge-side joist element on the neighboring eaves side joist element at a height above the surface of the photovoltaic module lying on the eaves-side element so that the ridge side joist element can move longitudinally. The width of a photovoltaic module can be equal to a whole-number, or integral, multiple of the system coverage width of the roofing plate, so that in the ridge-eaves direction, the length of the area inside a photovoltaic module having the photovoltaic cells is preferably shorter than the shortest coverage length of a neighboring roofing plate, so that a photovoltaic module has, at the ridge side, a peripheral segment free of photovoltaic cells, and that a sub-roofing element can be laid on a joist element and below the photovoltaic module, which sub-roofing element preferably has a water drain channel that can be positioned underneath the longitudinal edge of a photovoltaic module.

For the installation of a first photovoltaic module, at least two joist elements located in a row parallel to the eaves and in lines running parallel to one another in the pitch-eaves, or ridge-eaves, direction are necessary. The lowest joist element of a line is fastened to a first roof batten with its ridge-side terminal segment, while its eaves-side terminal segment overlaps a neighboring roofing plate in the eaves direction, and is fastened, by means of a stay, for example, to an eaves-side second roof batten. The first module is then placed on the upper side of the lower joist element. The ridge-side joist element to be laid in the same line is connected in the vicinity of its eaves-side terminal segment with the support or lug of the lower joist element, and is placed on the ridge-side on a ridge-side third roof batten. In this case, the ridge-side joist element is supported at a height above the surface of the first module so that it can be moved to adjust it to the respective distance between the roof battens in the eaves direction, without thereby butting up against the first module.

During this displacement, the ridge-side joist element is positioned so that its ridge-side terminal segment can be fastened on one hand to the third roof batten, and on the other hand, so that its eaves-side terminal segment overlaps the first module on the ridge side. The overlapping eaves-side terminal segment of the joist element nearer the ridge thereby prevents the first module from lifting off the joist element underneath. A second module is then placed over two parallel ridge-side joist elements, and overlaps a ridge-side terminal segment of the first module.

The photovoltaic modules laid on the joist elements in a row parallel to the eaves can be butted up against one another or against neighboring roofing plates. In that case, there is a gap at each joint that must be sealed to prevent the penetration of rainwater. On the photovoltaic system as claimed by the invention, therefore sub-roofing elements can be laid on a joist element and underneath the photovoltaic module, the water channels in which can be positioned underneath the longitudinal edge of a photovoltaic module. These sub-roofing elements can be made of thin plastic material, for example, and in the simplest case can be realized in the form of a drain channel that has an approximately U-shaped cross section.

The photovoltaic modules of this photovoltaic system, as a result of their dimensions, can be installed in place of a number of commercially available roofing plates. The length of the photovoltaic modules is advantageously the same as the length of a roofing plate. Because the coverage width of concrete roofing tiles is generally 30 cm and the coverage width of clay roofing tiles is 20 cm, the width of a photovoltaic module can be selected, for example, so that it equals the coverage width of four concrete roofing tiles or six clay roofing tiles, for example, so that the outside dimensions of the photovoltaic module are approximately 38 cm×120 cm. Of that area, an area of 25 cm×114 cm can be occupied by photovoltaic elements, whereby on each longitudinal side there can be a free edge of 3 cm, an edge of 2 cm toward the eaves and 11 cm toward the ridge. Such a photovoltaic module can currently use silicon cells to generate an electric power of approximately 35 Watts. One generator unit should have at least 20 modules.

In an offset arrangement of the roofing plates, these plates are offset in a row by one-half the coverage width with respect to the edge-side or eaves-side neighboring row. If a plurality of modules are laid partly overlapping one another in the ridge-eaves direction, preferably these modules are likewise offset in each row by one-half the coverage width of a roofing plate when laid adjacent to an offset roof covering, or roofing plate, i.e. By approximately 10 to 15 cm. Because the joist elements can be arranged as required in the transverse direction, it is nevertheless possible to lay them in a line, without requiring any compensation on the edges involving the use of half-width roofing plates.

The distance between the roof battens can be varied from roof to roof as a function of the overlap of the roofing plates. The greatest overlap and thus the smallest coverage length is on a roof that has a flat pitch angle. To be able to integrate the photovoltaic system into any desired roof, it is thereby advantageous if the area within a photovoltaic module that contains the photovoltaic cells is not longer than the shortest coverage length. In this manner, the photovoltaic cells will not be in shadows, which can occur in marginal cases if a module designed for a greater coverage length is inadvertently laid on a roof that has a shorter coverage length. The system is thereby extremely easy to use, and can even be installed by do-it-yourselfers.

The installation of the photovoltaic system is particularly simple if, in relation to the level of the roof substructure, the height of the upper side of a joist element is equal to at least the height of the water channel of a laterally-adjacent roofing plate, so that the edge of a photovoltaic module adjacent to the water channel of a roofing plate is laid overlapping the water channel and the edge of a photovoltaic module adjacent to the cover channel of a roofing plate is laid so that it abuts the cover channel.

The photovoltaic system can be integrated particularly easily into a pitched roof covered with commercially available flat roofing plates made of concrete or clay. Flat roofing plates made of concrete are generally 42 cm long, 33 cm wide and 2.2 cm high. They have a coverage width of 30 cm and, depending on the pitch of the roof, a coverage length from 31 to 34 cm. The height of the water channel is 1.2 cm above the lower edge, so that photovoltaic modules can be laid close up against the upper side of the roofing plates.

The support can be located on the ridge-side end on the upper side of a joist element.

The modules can be installed and replaced essentially without requiring the use of tools, if a joist element, on its eaves-side end, has a locator or receptacle that grips the edge of a module, and if the free width between the edge of the locator and the support is equal to at least the length of a module. In this manner, during installation, a module can be pushed up to the supports of the joist element, then laid on the joist elements, and then inserted into the locator in the eaves-direction. The module can be removed by following the reverse sequence of operations. It goes without saying that a locator that grips the eaves-side end of the joist element can also be provided on the module. The electrical connections can be advantageously realized in the form of plug-in connectors.

There is no need for special measures to secure the installation of the photovoltaic system, if the support of a joist support Element is realized in the form of a toggle-like coupling element that is engaged in a slot on the underside of the overlying joist element, to prevent any lifting-off of the overlying joist element.

The photovoltaic modules of the photovoltaic system are particularly flat if they are realized without a frame.

To create a tight seal, in particular for a photovoltaic module, in particular one that has a smooth underside, it is advantageous if the sub-roofing element extends over at least the entire width of a photovoltaic module and has an eaves-side edge that is realized so that it provides protection against penetration by snow and rain, which edge can be located in the overlapping area of two photovoltaic modules. Because there can be a gap of approximately 1.2 cm in the overlapping area of two modules approximately 1 cm thick on a roofing plate 2.2 cm thick, the sub-roofing element can be used to seal this gap.

This sealing is only effective against the penetration of water if the sub-roofing element has ventilation openings on its eaves-side edge. A labyrinth can be connected to these openings that also provides protection against blowing snow. Ventilation must be used, however, to conduct a cooling air flow along the underside of a photovoltaic module. Such an air flow prevents excessive heating and the related reduction in the output of a photovoltaic module. The heated air discharged on the ridge-side edge is advantageously guided along the underside of the following sub-roofing element, so that heated air does not come into contact with any other photovoltaic modules until it reaches the ridge.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The accompanying drawings illustrate at least one preferred exemplary embodiment of the invention, which is explained in greater detail below, wherein.

DESCRIPTION OF THE PREFERRED EMBODIMENT

Figure 1:
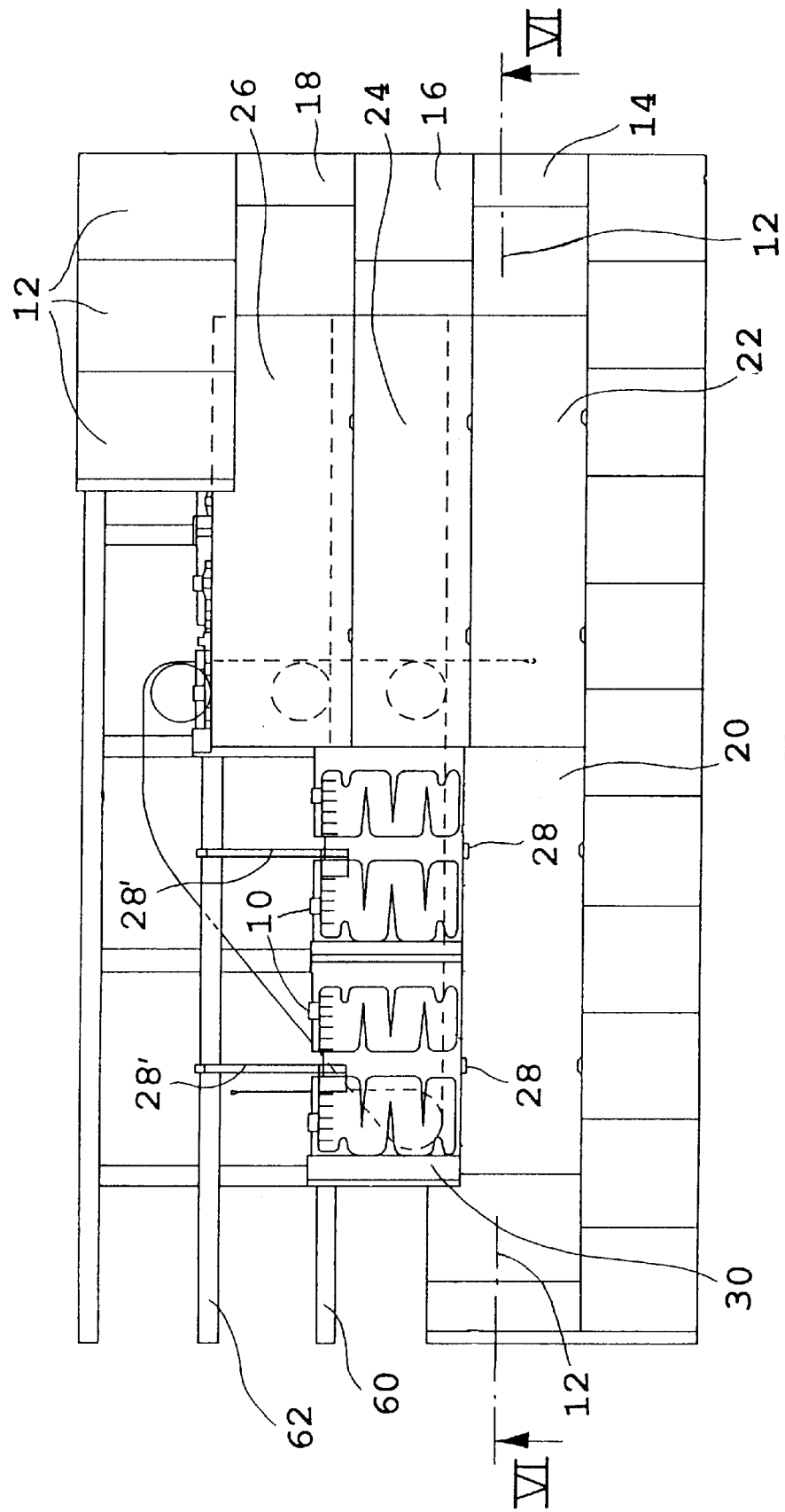
FIG. 1 shows a photovoltaic system as claimed by the invention in an overhead view.

European Patent No. 0 547 285 and German Patent No. 33 14 637 disclose a roofing plate that can be provided on its upper side with a small-format photovoltaic module. The roofing plate is provided on one longitudinal edge with a water channel or drip edge, and on the other longitudinal edge with A cover channel or water stop. The photovoltaic module is always supported on the roofing plate close to the water channel and the cover channel. When the roof is being laid, the roofing plates are laid in a course parallel to the eaves, whereby one roofing plate, with its cover channel, always overlaps the water channel of a neighboring roofing plate in the same course, so that no rain water can penetrate between the roofing plates.

A further object of the invention is to create a seal for a system of structural elements, in particular a photovoltaic system, in which the structural elements are butted up against one another in the transverse direction and against neighboring roofing tiles, partly overlap one another in the longitudinal direction, and are laid on joist elements that are located at a distance from a butt joint.

The invention teaches that this latter object can be accomplished if the sub-roofing element on the joist elements and underneath a plate-shaped structural element can be laid and is shaped so that there is at least one raised bead that runs in the ridge-eaves direction, can receive a joist element and the bead is wider than the joist element, so that the sub-roofing element can be displaced parallel to the eaves, and so that the water channel can be located underneath the longitudinal edges of two plate-shaped elements butted up against one another. Preferably, the joist elements are laid in lines tangent to approximately the quarter points, or quarter-chord points, of the structural elements, so that the transverse distance between two joist elements equals one-half the width of a structural element. It is therefore advantageous to provide sub-roofing elements at approximately one-half the width of the structural elements. For example, sub-roofing elements that have outside dimensions of 42.1 cm×64.4 cm for use with photovoltaic modules that have outside dimensions of approximately 38 cm×120 cm. the width dimension which is greater than one-half the width results from the fact that two neighboring sub-roofing elements are laid so that their edges overlap. An overhang in the longitudinal direction makes possible good ventilation on the underside of the photovoltaic modules.

A sub-roofing element essentially does not need to absorb any bearing forces, so that it can be made of a plastic film, i.e. one that can be manufactured using a deep drawing, or swedging, or extrusion process. When very thin material is used, the use of a reinforcement is recommended in the vicinity of the water channel, which can be realized in the form of a groove or trough, for example, as a separate component.

The sub-roofing element can lie on the upper side of the joist element and protect the underside of the structural element, if the sub-roofing element has a penetration at least in the vicinity of the eaves-side terminal segment of the raised bead that contains the joist element, through which penetration a locator of the joist element for the plate-shaped structural element can be inserted.

A tight laterally overlapping laying of the sub-roofing elements is possible if, in the vicinity of both longitudinal edges, at least one raised bead is provided, whereby the raised bead on one end can act as a receptacle for the raised bead on the other edge of a neighboring, identical sub-roofing element. Preferably, the raised bead is narrow on one edge and sufficiently wide on the other edge so that the narrow raised bead covered by the wide raised bead can be pushed sideways. Dimensional tolerances can thus be easily compensated during laying. In particular when installing structural elements that are laid on one side on the water channel of an adjacent roofing plate, but have a butt joint on the other side, there coverage width in the transverse direction for the structural element on top of the water channel is less than for another element. Therefore it is advantageous if the sub-roofing element laid adjacent to the water channel of the roofing plate can be displaced by the width of the water channel in the transverse direction toward the neighboring sub-roofing element.

To explain, in at least one embodiment of the present invention when a structural element is installed such that a longitudinal edge overaps the water channel of an adjacet roofing plate, the amount of this overlap can reduce the transverse coverage width which the sub-roofing elements preferably cover, as compared to another possible structural element. Therefore, it is advantageous if the sub-roofing element laid adjacent to the water channel of the roofing plate can be displaced, or shifted, by the width of the water channel in the transverse direction toward the neighboring sub-roofing element.

This capability can be achieved if the receiving raised beads are wider than the raised beads or the joist to be received.

The sub-roofing element can create a particularly good seal for the peripheral area of a structural element lying on the water channel of a neighboring roofing plate if the peripheral segment of the longitudinal edge adjacent to the receiving raised bead is as wide as the raised bead it is designed to receive. The peripheral segment of the sub-roofing element can thereby be positioned underneath the water channel.

The receiving raised bead on one longitudinal edge and the water channel on the opposite longitudinal edge can be realized so that they are approximately complementary to one another, if the water channel is realized so that it is adjacent to the receiving raised bead.

Not only can the sub-roofing element drain off any water that has penetrated, but it can also influence the ventilation underneath the structural elements, if the longitudinal edges and the eaves-side edge of the sub-roofing element run at the height of the low areas, or recessed areas, and the ridge-side edge runs at the height of the equally-high raised beads, whereby all the raised beads have the same height.

The objective is to have a controlled ventilation, to conduct a cooling air current along the underside of a photovoltaic module. In midsummer in particular, it thereby becomes possible to prevent excessive heating and the related decrease in the efficiency of a photovoltaic module. Advantageously, the heated air being discharged at the ridge-side edge is guided along the underside of the following sub-roofing element, so that the heated air does not come into contact with other photovoltaic modules before it is exhausted at the ridge. To achieve this ventilation, a sub-roofing element is preferably longer than a photovoltaic module. The sub-roofing element projects beyond the ridge-side edge of the photovoltaic module, so that the air that enters at the eaves-side edge can be discharged toward the ridge.

The penetration of snow and small animals in the gap between the overlapping structural elements can be prevented if there are baffles that form labyrinths on the eaves-side edge of the sub-roofing element. These chambers form a labyrinth, through which nothing can pass directly.

The installation of the sub-roofing elements and of the joist elements is simplified if, on the ridge-side edge, there is at least one suspension lug for the suspension of the sub-roofing element on a roof batten or a similar structure. The sub-roofing element is thereby adjusted in the longitudinal direction with respect to the ridge-side upper edge of the roof batten. If the distance between the suspension lugs and the eaves-side edge is essentially equal to the distance between the suspension lugs and the eaves-side edge of a neighboring roofing plate, the result for the sub-roofing elements claimed by the invention is the same geometric position as for the neighboring roofing plates, regardless of the actual distance between the roof battens. This distance can vary from roof to roof on account of the overlap of the roofing plates, which is a function of the pitch of the roof.

FIG. 1 shows a schematic overhead view of the status during construction with the sub-roofing elements 10 on a pitched roof partly covered with flat roofing plates 12 made of concrete and laid in offset courses 14, 16, 18. The figure shows photovoltaic modules 20, 22, 24, 26 on the roof. In the second course 16, in an area not covered with photovoltaic modules, there are sub-roofing elements 10, and in the course 18 above that, there are joist elements 28 shown in the early stages of construction. The sub-roofing elements 10, after installation, lie underneath the photovoltaic modules and above the joist elements which support the photovoltaic modules.

The sub-roofing elements 10 are approximately one-half as wide as a photovoltaic module 20, 22, 24, 26 and each of them has a trough-shaped water channel 30 on its left edge as illustrated in FIG. 1. The photovoltaic modules 20, 22 laid next to one another in the lowermost course 14 are butted up against one another. On its other end, the photovoltaic module 22 is in contact with the water channel of the neighboring roofing plate 12, while the photovoltaic module 20 is butted up against the cover channel of the neighboring roofing plate 12. Underneath the butt joints, there are water channels of sub-roofing elements not visible here underneath the photovoltaic modules 20 and 22, which sub-roofing elements are identical to the visible sub-roofing elements 10.

Figure 2:
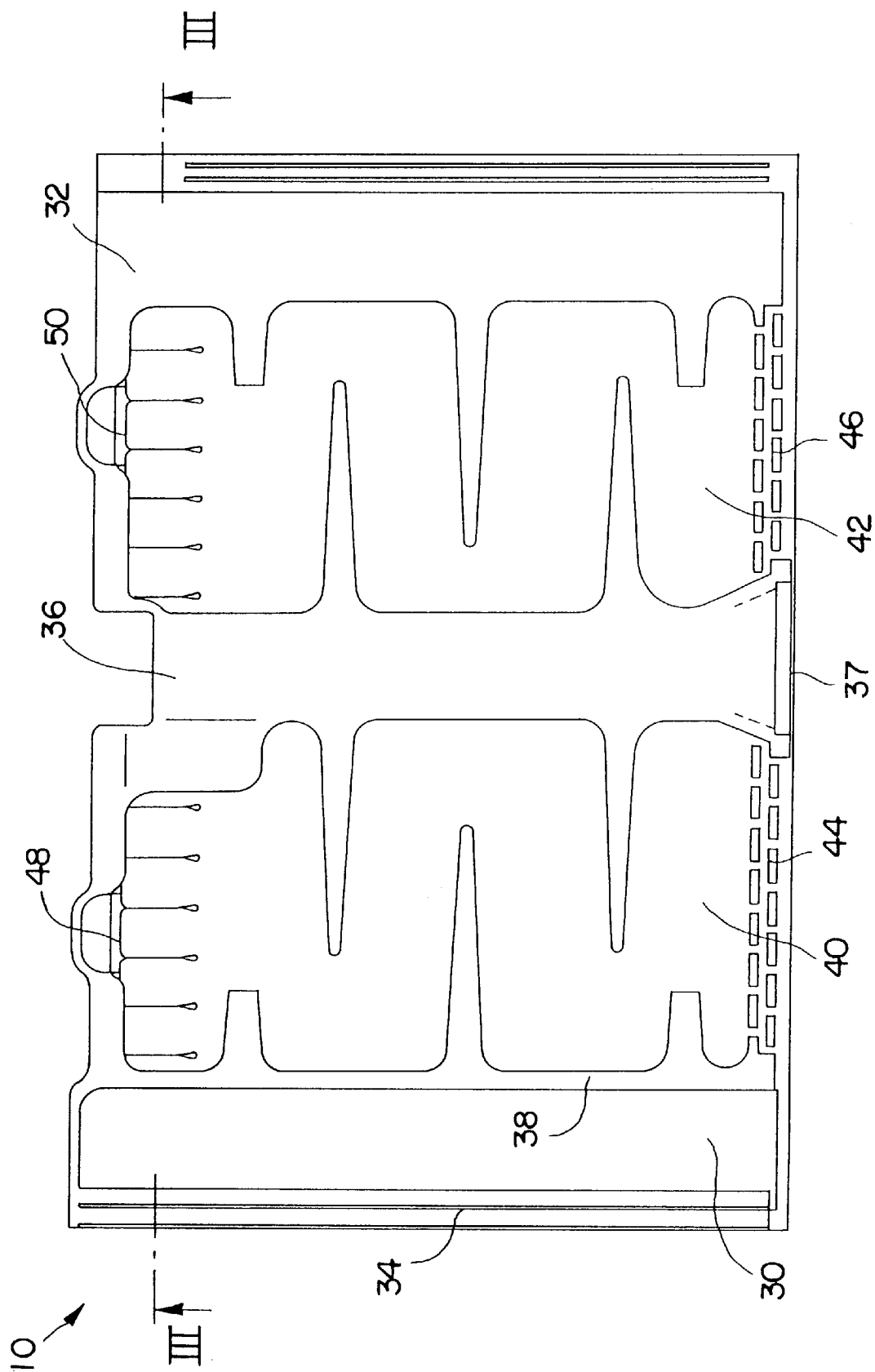
FIG. 2 shows a sub-roofing element in an overhead view.
Figure 3:
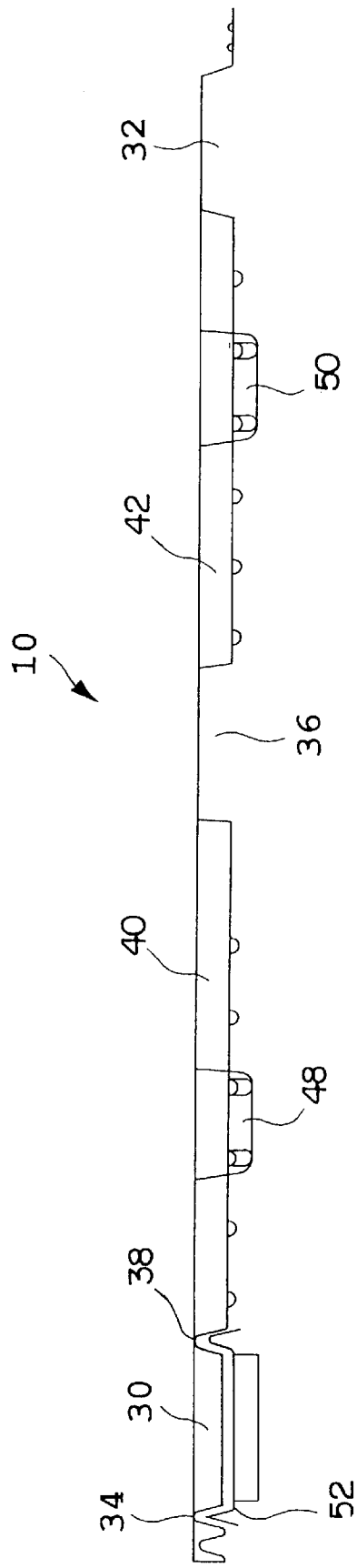
FIG. 3 shows the sub-roofing element illustrated in FIG. 2 in a cross section along line III—III.

FIGS. 2 and 3 illustrate a sub-roofing element 10 in an overhead view. This element can consist of deep-drawn plastic film. With outside dimensions of 42.1 cm×64.4 cm×1.3 cm, the sub-roofing element 10 is suitable for a photovoltaic module having the dimensions 38 cm×120 cm, whereby two sub-roofing elements 10 are designed to be laid next to one another underneath a photovoltaic module. On the left side as illustrated in FIG. 2, there is a water channel 30 that is realized in the form of a wide recessed bead, while on the right-hand side there is a wide raised bead 32. On the outer longitudinal edge of the water channel 30 there is a narrow, double raised bead 34, which can be adapted to the bottom contour of the cover channel of a roofing plate 12, and can be received by the wide raised bead 32 of a neighboring sub-roofing element. A wide central raised bead 36 is provided as a receptacle for the joist element, which supports the structural element or the photovoltaic module. In the vicinity of its eaves-side terminal segment, the raised bead 36 that acts as a receptacle for the joist element has a penetration, through which a receptacle of the joist element can be inserted. The inner edge of the water channel forms a narrow raised bead 38. All the raised beads 32, 34, 36 and 38 run in the longitudinal direction, i.e. on the roof from the ridge to the eaves.

Between the raised beads 38 and 36 as well as 36 and 32 there are recessed areas 40 and 42 respectively, which can be provided with toothed reinforcement ribs that run in the transverse direction but not over the entire width of a recessed area 40, 42. On the eaves-side edge of each of the recessed areas 40, 42, there are two rows of baffles 44 and 46 respectively that form labyrinths. On the ridge-side edge of each recessed area 40, 42, there is a suspension lug 48, 50.

Figure 4:
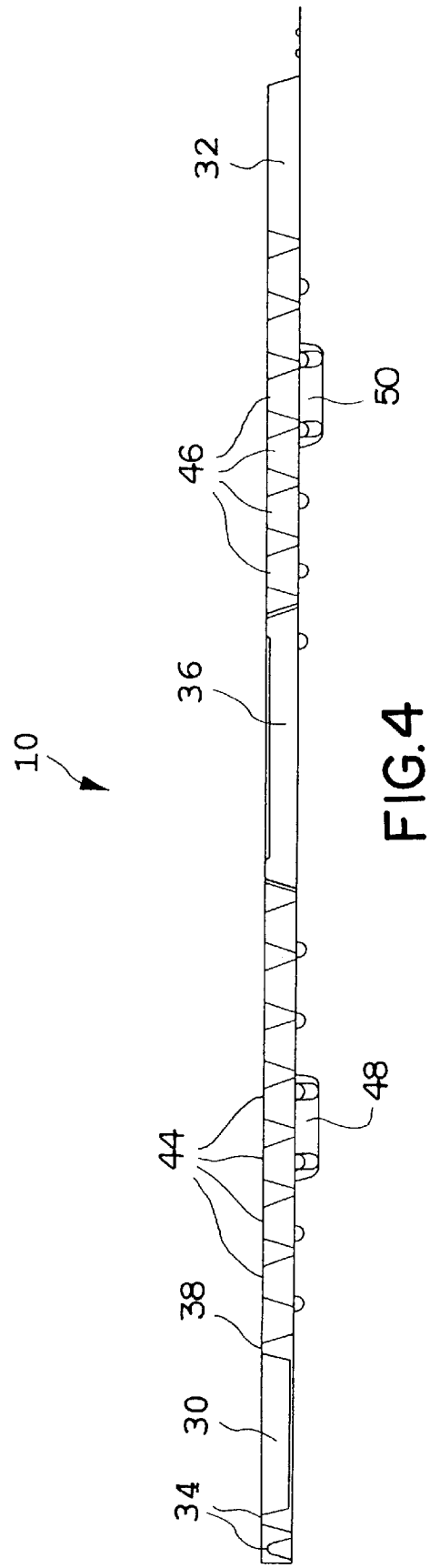
FIG. 4 shows the sub-roofing element illustrated in FIG. 2 in an end view, from the eaves side.
Figure 5:
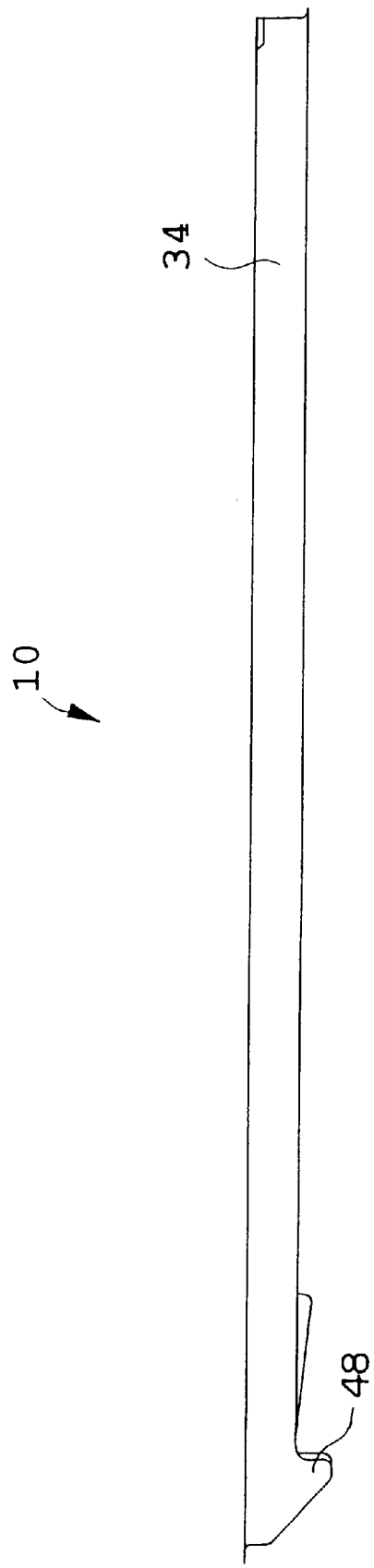
FIG. 5 shows the sub-roofing element illustrated in FIG. 2 in a side view.

FIGS. 3 to 5 illustrate the position and orientation of the raised beads 32, 34, 36 and 38 described above, of the water channel 30, of the recessed areas 40, 42, of the baffles 44 and 46 and of the suspension lugs 48 and 50.

In FIG. 3, below the water channel, there is a reinforcing component 52, in this case a channel preferably made of sheet metal. The side walls of this channel project into the raised beads 32 and 38. On the ridge-side edge, one tab is bent downward, so that the reinforcing component 52 can also be suspended on a roof batten.

Figure 6:
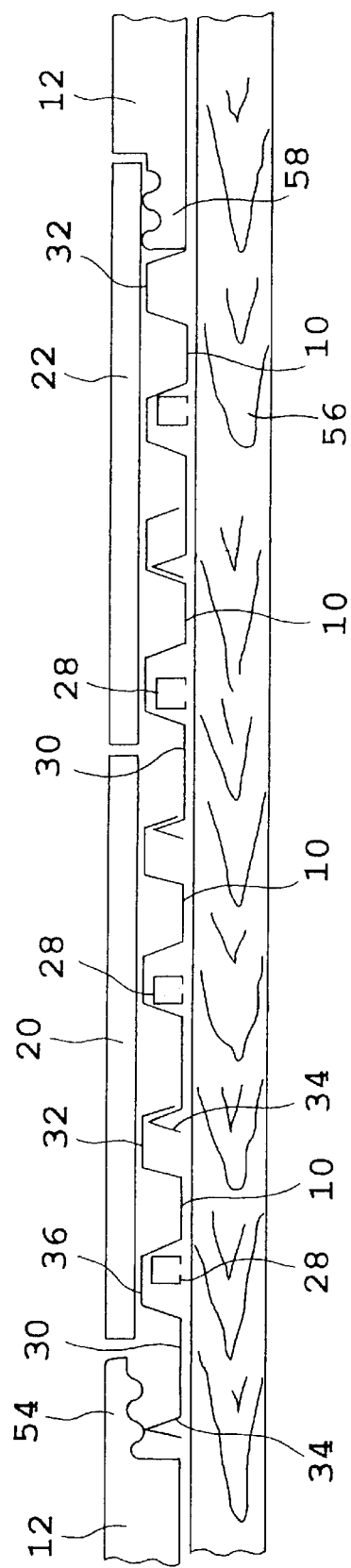
FIG. 6 shows the roof illustrated in FIG. 1, in a cross section along Line VI—VI parallel to the eaves, as viewed in the direction from the eaves toward the ridge.

FIG. 6 shows, in course 14 of the roof illustrated in FIG. 1, in a cross section along a liner VI—VI parallel to the eaves, and shown in a view looking from the eaves to the ridge. In this case, on the left is the first roofing plate 12, which has a raised cover channel 54 on the right side. The first roofing plate 12 is followed by a first sub-roofing element 10, which is in contact with its narrow raised bead 34 running on the left longitudinal edge against the underside of the cover channel 54 of the first roofing plate 12, while the exposed longitudinal edge of the cover channel 54 is located above the water channel 30 of the first sub-roofing element 10. The first sub-roofing element 10 is penetrated in its transverse direction approximately centrally by a first joist element 28 which is fastened to a roof batten 56, which joist element is mounted so that it can move in the transverse direction within a raised bead 36 located approximately in the center of the sub-roofing element 10. With its wide raised bead 32 running on the right longitudinal edge, the first sub-roofing element 10 covers the narrow raised bead 34 running on the left longitudinal edge of a second sub-roofing element 10, which is fastened in the same manner with a second joist element 28.

So that two neighboring sub-roofing elements 10 retain their maximum dimension in the transverse direction, the second sub-roofing element 10 has been pulled to the right during the laying in the direction parallel to the eaves, so that its narrow raised bead 34 is located by the wide raised bead 32 of the first sub-roofing element 10. Located on the two joist elements 28 is the first photovoltaic module 20, which is butted up against the cover channel 54 of the first roofing plate 12 on the left and up against the neighboring second photovoltaic module 22 on the right. To the right of the second sub-roofing element 10, a third sub-roofing element 10 is laid in the manner described above. In this case, the joint of the photovoltaic module 20, 22 is located above the water channel 30 of the third sub-roofing element 10.

To the right of the third sub-roofing element 10, in a manner similar to that described above, a fourth sub-roofing element 10 is laid, which is butted with its wide raised bead 32 running on the right longitudinal edge against the left-side recessed water channel 58 of the second roofing plate 12. The third and fourth sub-roofing elements 10 are overlapped by the second photovoltaic module 22.

Because the first three sub-roofing elements 10 have each been laid with their maximum extension, and the fourth sub-roofing element 10 is butted up against the second roofing plate 12, the necessary coverage width of the fourth sub-roofing element 10 is smaller by the width of the water channel 58 of the second roofing plate 12 than the maximum extension. During laying, the fourth sub-roofing element 10 has therefore been shifted to the left by the width of the water channel 58 in the direction parallel to the eaves, so that its narrow raised bead 34 held by the wide raised bead 32 of the third sub-roofing element 10 is in contact against the left lateral surface of the wide raised bead 32 of the third sub-roofing element 10. During the shifting, the central raised bead 36 of the fourth sub-roofing element 10 that holds the joist 28 has been displaced relative to the joist element 28. The configuration of the sub-roofing elements 10 claimed by the invention therefore makes it possible to adjust the coverage width of a sub-roofing element 10 to the respective structural requirements.

One feature of the invention resides broadly in the sub-roofing element 10 for a flat, plate-shaped structural element, in particular for a photovoltaic module 20, 22, 24, 26, which can be fastened on a pitched roof with joist elements 28 that can be laid in the ridge-eaves direction, whereby the sub-roofing element 10 is made of watertight material and has at least one water channel 30, characterized by the fact that the sub-roofing element 10 can be laid on the joist elements 28 and underneath a plate-shaped structural element, and is shaped so that it has at least one raised bead 36 running in the ridge-eaves direction, which can locate a joist element 28 and is wider than the joist element 28, so that the sub-roofing element 10 can be shifted parallel to the eaves, and so that the water channel 30 can be located underneath the longitudinal edges of two plate-shaped structural elements butted up against one another.

Another feature of the invention resides broadly in the sub-roofing element characterized by the fact that it is made of a plastic film.

Yet another feature of the invention resides broadly in the sub-roofing element characterized by the fact that the sub-roofing element 10, at least in the vicinity of the eaves-side terminal segment of the raised bead 36 holding the joist element 28 has a penetration 37, through which a receptacle of the joist element 28 for the plate-shaped structural element can be inserted.

Still another feature of the invention resides broadly in the sub-roofing element characterized by the fact that in the vicinity of each of the two longitudinal edges there is at least one raised bead 32, 34, whereby a raised bead 32 on the one edge is capable of holding the raised bead 34 on the other edge of a neighboring, identical sub-roofing element 10.

A further feature of the invention resides broadly in the sub-roofing element characterized by the fact that the receiving raised bead 32 is wider than the raised bead 34 it receives.

Another feature of the invention resides broadly in the sub-roofing element characterized by the fact that the edge segment of the longitudinal edge adjacent to the receiving raised bead 32 is as wide as the receiving bead 32.

Yet another feature of the invention resides broadly in the sub-roofing element characterized by the fact that the water channel 30 is realized so that it is adjacent to the receiving raised bead 34.

Still another feature of the invention resides broadly in the sub-roofing element characterized by the fact that the longitudinal edges and the eaves-side edge of the sub-roofing element 10 run at the height of the recessed areas 40, 42 of the sub-roofing element 12 and the ridge-side edge runs at the height of the equally-high raised beads 32, 34, 36, 38, whereby all the raised beads 32, 34, 36, 38 have the same height.

A further feature of the invention resides broadly in the sub-roofing element characterized by the fact that there are baffles 44, 46 that form labyrinths on the eaves-side edge.

Another feature of the invention resides broadly in the sub-roofing element characterized by the fact that on the ridge-side edge there is at least one suspension lug 48, 50 for the suspension of the sub-roofing element 10 on a roof batten or similar fixture.

Concerning the joist elements, on a photovoltaic module that has a length of 38 cm and a width of 120 cm, for example, the transverse distance between the joist elements of a course parallel to the eaves is approximately 60 cm. When a plurality of structural elements are laid in overlapping fashion between the ridge and the eaves, a plurality of joist elements can be located in a single slope line.

The length of a joist element is preferably greater than the length of a structural element, and the structural element is in turn can be longer than the longest coverage length of the neighboring roofing plates.

The lug that transmits the load from the base-side terminal segment of an overlapping joist element to the overlapped joist element can be realized in a particularly stable manner if it is located on the upper side of the joist element in the vicinity of its ridge-side terminal segment. This terminal segment projects beyond the ridge-side edge of the structural element.

The joist element can be manufactured in the form of a stamped sheet metal part, if the lug is, for example, realized in the form of a separate component. The lug, for example, can be realized in the form of a bracket made out of bent sheet metal, whereby the ends of the legs are firmly connected to the joist element.

No additional stays are necessary if the upper terminal segment of the lugs is realized in the form of a coupling element that can be connected with a corresponding coupling part on the joist element to be supported nearer the ridge, and so that it can be displaced in the longitudinal direction, to prevent the joist element nearer the ridge from lifting up.

The fabrication of a joist element with a lug can be particularly simple if, for example, the lug can be fastened to the joist element by means of locking connection elements.

A form-fitting and longitudinally movable connection between the lug and the joist element nearer the ridge can be created, for example, if the joist element, at least in the vicinity of its eaves-side terminal segment, has a longitudinal slot and the lug has a toggle-like extension. The toggle-like extension of a lug can project through the slot of the neighboring joist element nearer the ridge. This longitudinally movable coupling prevents the liftoff of the joist element nearer the ridge, but in the longitudinal direction is represents a movable bearing, so that variations in the distances between the roof battens can always be compensated.

An economical realization of the joist element is possible if it is realized in the form of a thin-walled profile, preferably in the form of a hollow profile. Preferable, the joist element over the greater part of its length is realized in the form of a C-section open on the bottom.

Plate-shaped structural elements as well as photovoltaic modules can be made particularly attractive if they are integrated into a pitched roof covered with commercial flat roofing plates made of concrete or clay. Flat roofing plates made of concrete are conventionally 42 cm long, 33 cm wide and 2.2 cm high.

Concrete flat roofing plates typically have a coverage width of 30 cm and, depending on the pitch of the roof, a coverage length of 31 cm to 34 cm. The height of the water channel is 1.2 cm above the lower edge, so that photovoltaic modules approximately 1 cm thick can be laid essentially flush with the upper side of the roofing plates.

The modules can be installed and replaced essentially without the need for tools, if a joist element, on its eaves-side end, has a locator that grips the edge of a plate-shaped structural element in the manner of a hook. Preferably, the base of the receptacle, which is realized so that it has approximately the shape of a "U" laid on its side, is higher than the thickness of a structural element inserted into it, so that even in a skewed or warped position of two joist elements supporting the same structural element, essentially no torsional forces will be exerted on the structural element. An elastic or plastic deformable intermediate layer can fill up any spaces in between.

During the installation operations, a module can be pushed in the direction of the ridge until it contacts the lugs of the joist elements, then laid on the joist elements, and then inserted into the receptacle in the eaves direction, when the distance between the base of the receptacle on the eaves-side end and the lug on the ridge-side end is greater than the length of the plate-shaped structural element by at least the length of the hook of the receptacle. The module can be removed by reversing the sequence of operations.

Any damage to the underside of the structural element by a fastening element for the windproof fastening of the joist element can be prevented if, on the ridge-side end of the joist element, there is a bearing for a fastening element for the fastening to the roof substructure. If a screw is used as the connecting element, it is recommended that a countersink be provided on the upper side of the joist element to hold the screw head.

The correctly fitting installation of the plate-shaped structural elements is facilitated if, on the ridge-side end of a joist element, on the underside, there is a projection that makes it possible to hang the joist on the roof substructure. This projection acts in a manner that is similar toga hanging lug of a roofing plate, in that it adjusts the joist element in the longitudinal direction with respect to the ridge-side upper edge of the roofing batten. The eaves-side edge of the structural element is held by the receptacle of the joist element. If the distance between the projection and the base of the receptacle is equal to the distance between the suspension lug and the eaves-side edge of a neighboring roofing plate, the result is a geometric position for structural elements, in particular for photovoltaic modules, installed using the joist elements claimed by the invention, that is the same as for the neighboring roofing plates, regardless of the distance between the roofing battens and the actual overlap provided on the roof.

The accompanying drawing illustrates at least one preferred exemplary embodiment of the invention, which is explained in greater detail below in reference to the following figures.

Figure 7:
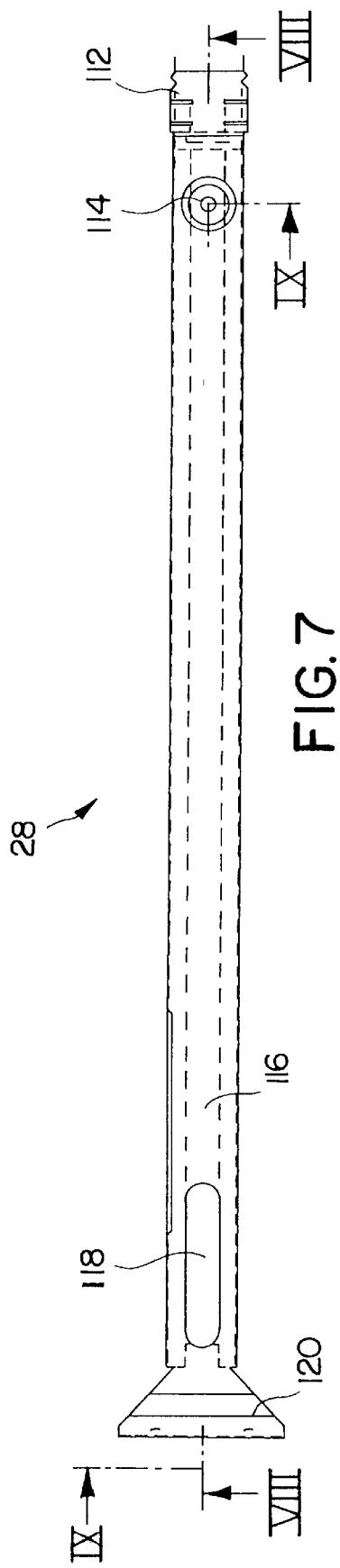
FIG. 7 shows a joist element in an overhead view.

FIG. 7 shows a joist element 28 stamped out of stainless steel and bent into the desired shape. On its ridge-side end, there is a lug 112, on which an identical neighboring joist element can be placed. As a bearing 114 for a fastening means for fastening to a roof batten, there is a countersink on the upper side of the joist element 28, in which the head of a screw, for example, can be placed. The joist element 28 is realized over almost its entire length in the form of a C-shape that is open on the bottom, and which has a slot 116 on the underside. In the vicinity of the eaves-side terminal segment, there is a slot 118 on the top, through which the fastening means of a joist element located below it can be reached. On the eaves-side end there is a U-shaped receptacle 120 for a structural element. The receptacle 120 is wider than the C-shape of the joist element 28.

Figure 8:
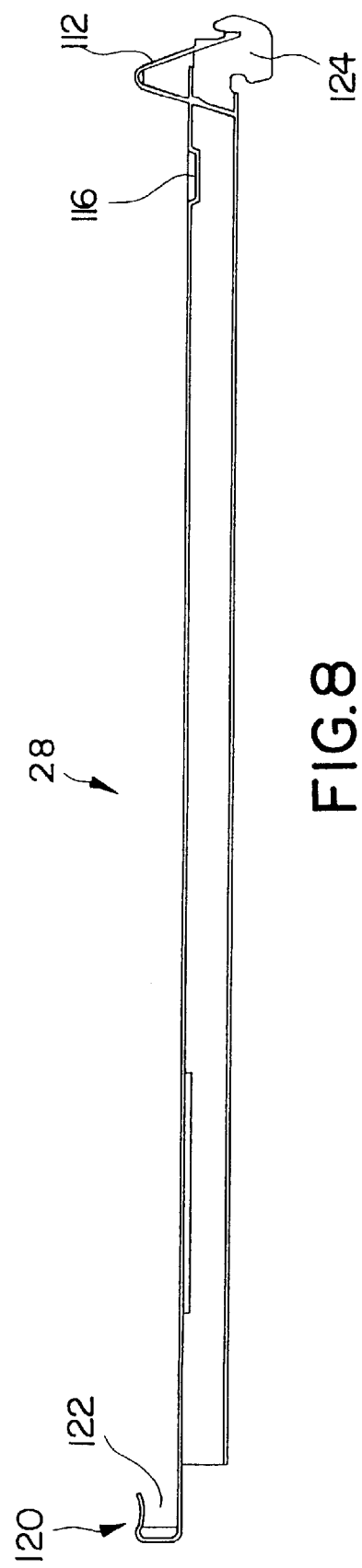
FIG. 8 shows the joist element illustrated in FIG. 7, in a longitudinal section along Line VIII—VIII.

FIG. 8 illustrates the arrangement of the lug 112 and the receptacle 120 in longitudinal section. The receptacle 120 projects beyond the C-shaped area of the joist element 28. Consequently, the material can be deformed under the effect of large torsional forces as a result of twisted roof battens, and thus prevent damage to the structural element installed on them. The base of the U-shaped receptacle 120 is lined with a strip 22 can be made of elastic material. The lug 112 is realized in the form of a bracket made of bent sheet metal, whereby the ends of the legs are fastened to the ridge-side end of the joist element 28. The edge of the bent portion of the lug 112 runs at about a right angle to the longitudinal axis of the joist element 28. Underneath the lug 112, the figure shows a projection 24 which can be hung on a roof batten like the suspension lug of a roofing plate.

Figure 9:
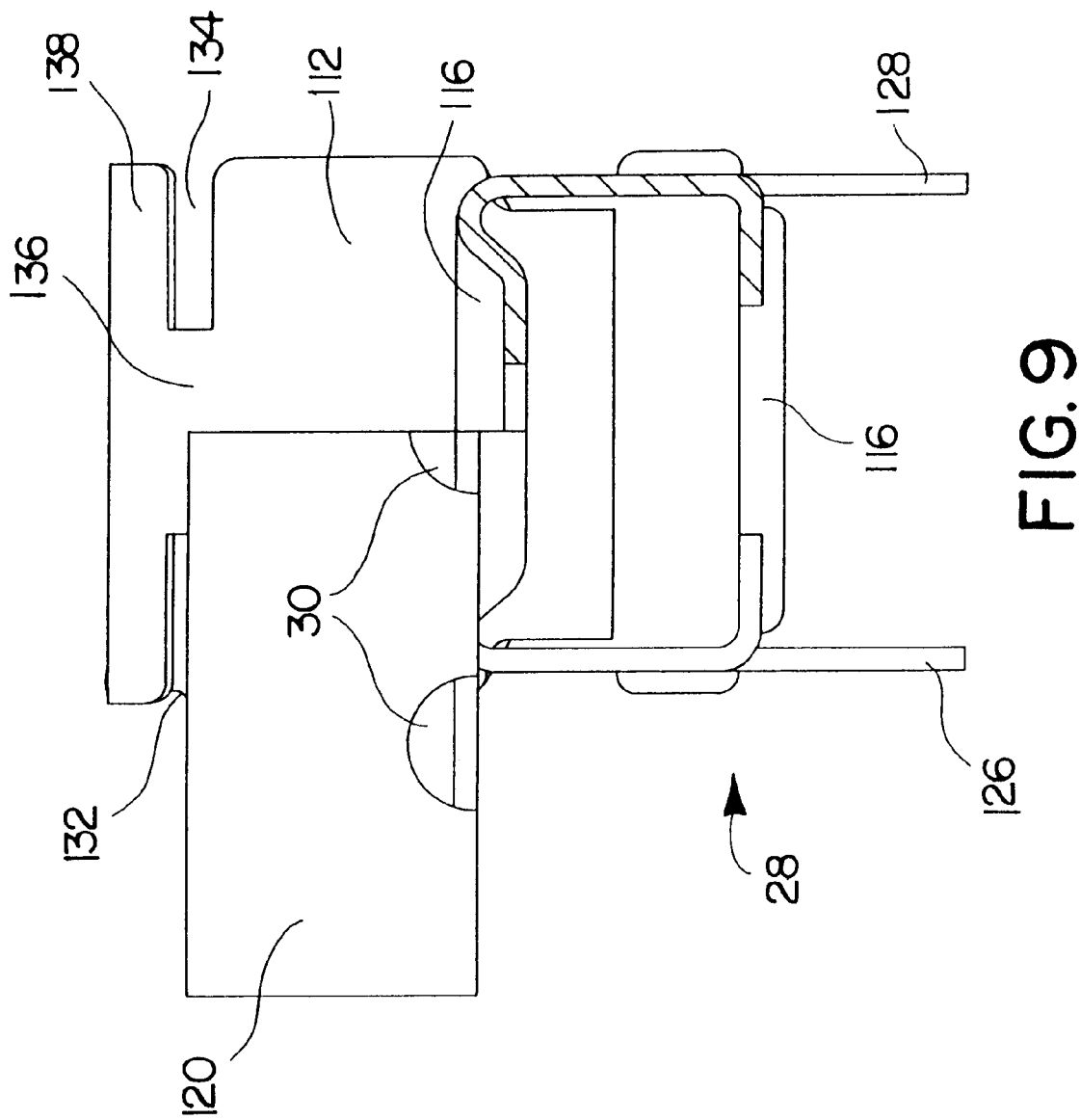
FIG. 9 shows the joist element illustrated in FIG. 7, in a longitudinal section along Line IX—IX.

FIG. 9 shows a partial cross section of the joist element 10 along line IX—IX in FIG. 7. The left half of the figure shows the realization of the receptacle 120 and the right half of the figure shows the realization of the lug 112. On the underside of the joist element 28, there are projections 126, 128 that project beyond the ridge-side end. In the vicinity of the lower edge of the receptacle 120, there are penetrations 130 that make possible the discharge of fluid.

On the bracket-shaped lug 112, at a short distance from the upper edge, there are slots 132, 134 that begin on both sides of the edges. The upper terminal segment of the lug 112 can thereby be realized in a simple manner in the form of a toggle-like extension 138 with side wings separated from the lug 112 by slots 132, 134, whereby the material between the slots 132, 134 forms the neck 136 and the wall in the vicinity of the upper edge of the toggle. A neighboring joist element to be supported that is identical to the joist element 28 can be inserted into the slots 132, 134, so that the neck 136 rests in a form-fitting manner in the slot 116, and the toggle-like extension 138 rests inside the neighboring joist element.

Figure 10:
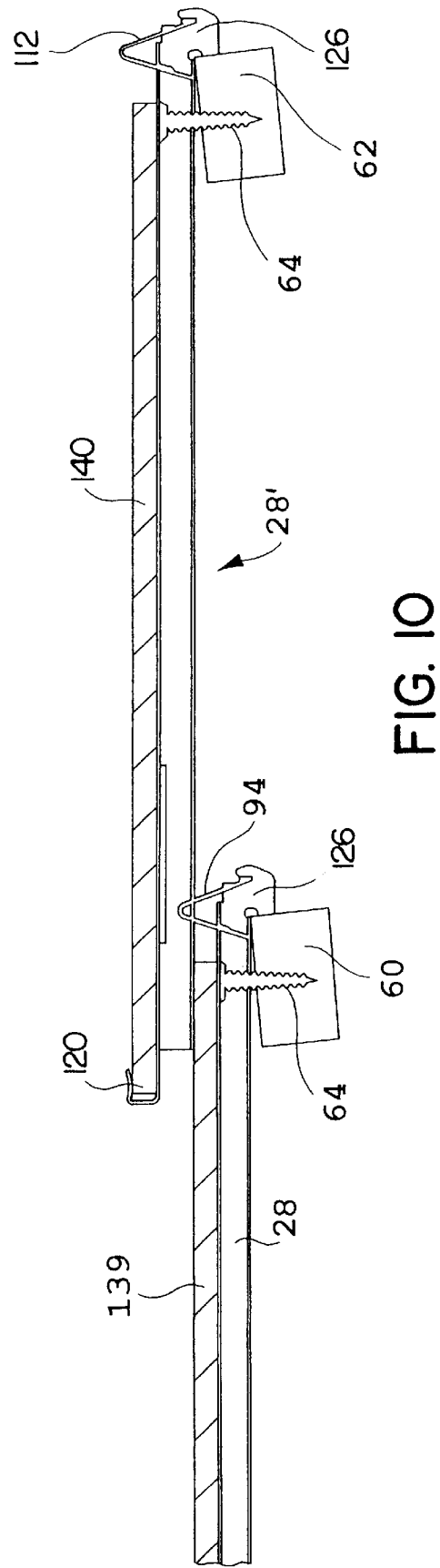
FIG. 10 shows two installed joist elements, in a side view.

FIG. 10 shows two overlapping flat plate-shaped structural elements 139, 140 on joist elements 28 and 28 respectively in longitudinal section, whereby the joist element 28 nearer the ridge is supported on the neighboring joist element 28 toward the eaves. The reference numbers indicate the same parts as in FIGS. 7 to 9. The U-shaped receptacle 120 that grips the eaves-side end of the overlying structural element 140 in the manner of a claw is formed on the eaves-side end, as shown here on the joist element 28. Each of the joist elements 28, 110 lies with its ridge-side end in contact with a roof batten 60 and 62 respectively, and is fastened to the roof batten by means of a fastener 64 realized in the form of a screw. On the joist element 28, by way of example, the figure shows the support of the eaves-side end, which is theoretically the same for all the joist elements. The eaves-side end can be moved longitudinally and is supported by means of a lug 94 on the ridge-side end of the underlying joist element 28.

The support of the joist element 28 nearer the ridge is provided at a height that is at least equal to the thickness of the plate-shaped structural element 139. In this manner, the joist element 28 nearer the ridge can, during installation, be shifted in the eaves direction with respect to the lower joist element 28 and the overlying structural element 139, until its ridge-side projection 126 comes into contact with the side of the roof batten facing the ridge, and its eaves-side terminal segment overlaps the lower structural element 139. The upper structural element 140 lying on the joist element 28 nearer the ridge is at some distance from the lower structural element 139 as a result of the eaves-side terminal segment of the joist element 28 nearer the ridge, whereby it overlaps a ridge-side edge segment of the lower structural element 139.

One feature of the invention resides broadly in the joist element 28, 28 for fastening a flat plate-shaped structural element 139, 140 in particular a photovoltaic element, to a pitched roof, whereby the joist element 28 is laid in the ridge-eaves direction and can be fastened to the roof substructure, characterized by the fact that on the joist element 28 there is a lug or support 94 that supports a neighboring joist element 28 located in the same slope line in the ridge direction at a height above the surface of the plate-shaped structural element 139 lying on the joist element 28, so that it can be displaced longitudinally.

Another feature of the invention resides broadly in the joist element characterized by the fact that the lug 94 is located on the upper side of the joist element 10 in the vicinity of its ridge-side terminal segment.

Yet another feature of the invention resides broadly in the joist element characterized by the fact that the lug 94 is realized in the form of a separate component.

Still another feature of the invention resides broadly in the joist element characterized by the fact that the lug 94 can be fastened to the joist element 28 by means of locking connection elements.

A further feature of the invention resides broadly in the joist element characterized by the fact that the joist element 28, at least in the vicinity of its eaves-side terminal segment, has a slot 16 and the lug 94 has a toggle-like extension 38.

Another feature of the invention resides broadly in the joist element characterized by the fact that the joist element 28 is realized in the form of a thin-walled profile.

Yet another feature of the invention resides broadly in the joist element characterized by the fact that in relation to the plane of the sub-roofing construction, the height of the upper side of a joist element 28 is at least equal to the height of the water channel of a roofing plate.

Still another feature of the invention resides broadly in the joist element characterized by the fact that on the eaves-side end, there is a hook-like receptacle 20 that grips the plate-shaped structural element.

A further feature of the invention resides broadly in the joist element characterized by the fact that the distance between the base of the receptacle 120 on the eaves-side end and the lug 94 on the ridge-side end is greater than the length of the plate-shaped structural element 140 by at least the length of the hook of the receptacle 120.

Another feature of the invention resides broadly in the joist element characterized by the fact that on the ridge-side end of the joist element 28, there is a bearing 114 for a fastening element 64 for fastening to the roof substructure 42.

Yet another feature of the invention resides broadly in the joist element characterized by the fact that on the ridge-side end of a joist element 28, on the underside, there is a projection 126, 128 which makes it possible to hang the joist element 10 on the roof substructure 62.

Figure 11:
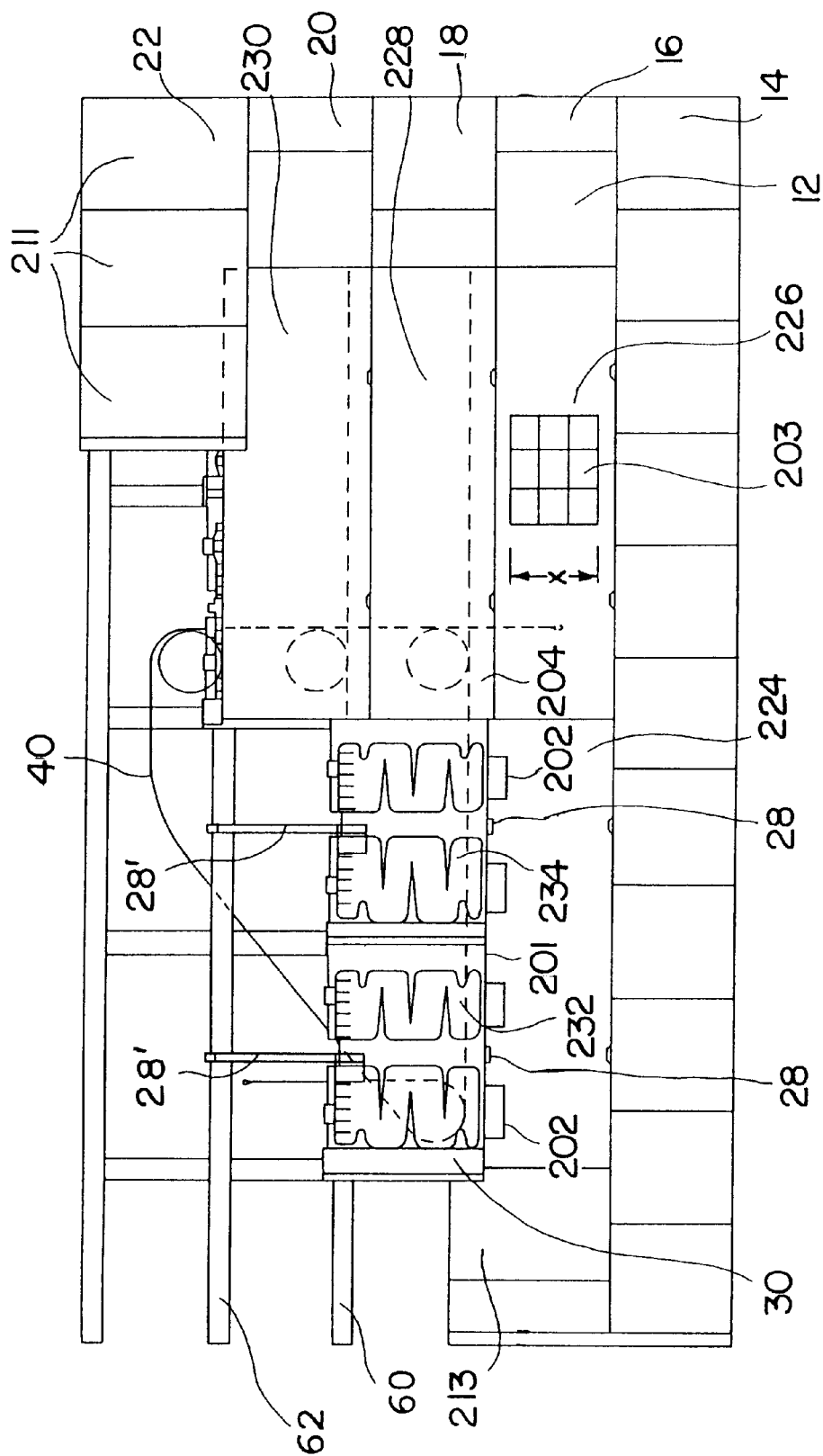
FIG. 11 is a view similar to FIG. 1 but with additional details.

FIG. 11 shows schematically additional possible features of at least one embodiment of the present invention wherein the sub-roofing elements 232, 234 extend over the entire width of a photovoltaic module and can have an eaves-side edge realized so that it provides a seal 201 against rain or snow, which edge can be located in the overlapping area between two photovoltaic modules 228, 226 or 230, 228. Further, in at least one embodiment the sub-roofing element 232, 234 can have ventilation openings 202 on its eaves-side edge. Further, FIG. 11 shows schematically that in one possible embodiment, the length X of the area inside a photovoltaic module 224, 226, 228, 230, having the photovoltaic cells 203 can be shorter that the shortest coverage length of a neighboring plate 211, 213, so that, on the side nearer the ridge, a photovoltaic module 224, 226, 228, 230 has an edge segment 204 that is free of photovoltaic cells. FIG. 11 also shows that for the electrical connections of the individual modules with one another and with other modules not shown here, there are cables 250, which are connected to the modules by means of plug-in connectors.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The published PCT application to which the present U.S. application corresponds, namely PCT/DE97/00648, the published Fed. Rep. of Germany application from which it claims priority 196 12 489.1, as well as all documents cited in the International Search Report issued thereon, including European Patent No. EP 0549 560 A issued to Sedelmayer on Jun. 30, 1993, French Patent No. 2 354 430 A issued to Radiotechnique Compelec on Jan. 6, 1978, Fed. Rep. of Germany Patent No. DE 44 08 508 A issued to Sesol Ges Fuer Solare Systeme on Sep. 21, 1995, Fed. Rep. of Germany Patent No. DE 92 09 228 U issued on Nov. 5, 1992, U.S. Pat. No. 4,040,867 issued to Forestieri et al. on Aug. 9, 1977, Fed. Rep. of Germany Patent No. DE 33 14 637 A issued to B M Chemie Kunststoff on Nov. 17, 1983, and Fed. Rep. of Germany Patent No. DE 43 32 873 A issued to Rieter Werke Haendle on Mar. 30, 1995, are hereby expressly incorporated by reference as if set forth in their entirety herein.

The published PCT application to which the U.S. application corresponds, namely PCT/DE97/00647, the published Fed. Rep. of Germany application from which it claims priority 196 12 490.5, as well as all documents cited in the International Search Report issued thereon, including European Patent No. EP 0547 285 A issued to Rieter Werkle Haendle on Jun. 23, 1993, Fed. Rep. of Germany Patent No. DE 33 14 637 A issued to B M Chemie Kunststoff on Nov. 17, 1983, Swiss Patent No. CH 682 831 A issued to Rolf on Nov. 30, 1993, and Great Britain Patent No. GB 2 266 903 A issued to Redland Eng. LTD on Nov. 17, 1993, are hereby expressly incorporated by reference as if set forth in their entirety herein.

The published PCT application to which the U.S. application corresponds, namely PCT/DE97/00646, the published Fed. Rep. of Germany application from which it claims priority 196 12 488.3, as well as all documents cited in the International Search Report issued thereon, including Federal Republic of Germany Patent No. DE 151 738 C issued to Internat. Maatschappij TOT Exploitatie van Gebreveteerde on May 31, 1994, Fed. Rep. of Germany Patent No. DE 221 279 C issued to Damm on Apr. 23, 1910, International Application No. WO 94 24384 A issued to Waddington on Oct. 27, 1994 (and its U.S. counterpart, U.S. Pat. No. 5,642,596 A, issued on Jan. 7, 1997), and French Patent No. FR 2 491 112 A issued to Gross on Apr. 2, 1982, are hereby expressly incorporated by reference as if set forth in their entirety herein.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

Some examples of U.S. Patents which could possibly be used in conjunction with the present invention are as follows:

Some examples of photo voltaic systems are:

| U.S. Pat. No. | Assignee | Inventor(s) | Title |
| --- | --- | --- | --- |
| 549413 | Optical Coating ing Lab., Inc. | Beauchamp et al. | UV/IR reflect-solar cell cover |
| 5460659 | Spectrolab, Inc. | Krut | Concentrating photovoltaic module and fabrication method |
| 5385614 | Photon Energy | Albright et al. | Series interconnected photovoltaic cells and method for making same |
| 5385615 | United Solar Tech., Inc. | Horne | Solar energy system |
| 5401331 | Midwet Research Institute | Ciszek | Substrate for thin silicon solar cells |
| 5403405 | JX Crystals, Inc. | Fraas et al. | Spectral control for thermophotovoltaic generators |
| 5415700 | State of Oregon | Arthur et al. | Concrete solar cell |
| 5437735 | United Solar Systems Corp. | Younan et al. | Photovoltaic shingle system |
| 5445177 | | Laing & Laing | Platform for the utilization of solar power |
| 5453134 | Semi-conductor Energy Lab. Co., Ltd. | Arai et al. | Solar cell |
| 5468304 | Texas Instr. Inc. | Hammerbacher | Output-increasing, protective cover for a solar cell |
| 5474621 | Energy Conversion Devices, Inc. | Barnard | Current collection system for photovoltaic cells |
| 5409549 | Canon Kabushiki Kaisha | Mori | Solar cell module panel |
| 5408990 | | Edling et al. | Solar energy collection panel assembly |
| 5394075 | Hughes Aircraft Co. | Ahrens et al. | Spacecraft bus regulation using solar panel position |
| 5379753 | | Noennich | Solar panel control apparatus |
| 5379596 | | Grayson | Self-contained hand-held solar chest |
| 5400986 | Martin Marietta Corp. | Amore et al. | Optical solar reflector and mounting method |
| 5439531 | | Finkl | Method and system for maintaining the efficiency of photovoltaic cells |

Some examples of solar energy collectors are:

| U.S. Pat. No. | Assignee | Inventor(s) | Title |
| --- | --- | --- | --- |
| 5411015 | Collins Starnes Assoc. Ltd. | Starnes | Radiation collectors |
| 5431149 | | Fossum & Fossum | Solar energy collector |
| 5452710 | Solar Attic, Inc. | Palmer | Self-sufficient apparatus and method for conveying |

-continued

| U.S. Pat. No. | Assignee | Inventor(s) | Title |
|---|---|---|---|
| | | | solar heat energy from an attic |
| 547848 | | Reed | Solar collector expansion assembly |
| 5477848 | | Hodak | Solar heating panel |

Examples of roofs and/or roofing structures or materials that may possibly to be used in at least one embodiment of the present invention may be found in U.S. Pat. Nos. 4,929,179 issued on May 29, 1990 to D. Breidenbach, et al.; 5,155,966 issued on Oct. 20, 1992 to D. Breidenbach, et al.; 4,550,791 issued to E. Isakov on Nov. 5, 1985; 5,237,352 issued on Aug. 17, 1993 to C. Grosser et al.; and 5,027,576 issued on Jul. 2, 1991 to L Gustavsson; and U.S. patent application Ser. Nos. 07/530,767 filed on May 25, 1990 having, inventors D. Breidenbach et al.; 08/691,978 filed on Aug. 2, 1996, having inventor E. Isakov; 06/809,073 filed on Dec. 13, 1985, having inventor U. Hintzen; 07/786,040 filed on Oct. 31, 1991, having invento L. Ballu, et al.; 08/996,827 filed on Dec. 23, 1997, having invento K. Hofmann; 09/002,455 filed on Jan. 2, 1998, having inventor H. Rapp et al.; and 09/036,463 filed on Mar. 6, 1998, having inventors A. Drechsler et al.

Examples of seals and/or sealing structures that may possibly be used in conjuction with at least one embodiment of the present invention might be found in U.S. Pat. Nos. 5,176,408, issued Jan. 5, 1993, to R. Pedersen; 5,177,139, issued on Jan. 5, 1993, to K. Klaar, et ano; 5,184,869, issued on Feb. 9, 1993, to K. Bauer; and 5,347,776, issued on Sep. 20, 1994, to J. Skoff.

All of the patents, patent applications and publications recited herein, and in the Declaration attached hereto, are hereby incorporated by reference as if set forth in their entirety herein.

The corresponding foreign and international patent publication applications, namely, Fed. Rep. of Germany Patent Application No. 196 12 489.1, filed on Mar. 29, 1996, and International Application No. PCT/DE97/00648, filed on Mar. 27, 1997, having inventors Manfred RINKLAKE and Norbert ROSLER, and International Publication No. WO 97/37388 published on Oct. 7, 1997, as well as their published equivalents, and other equivalents or corresponding applications, if any, in corresponding cases in Fed. Rep. of Germany and elsewhere, and the references cited in any of the documents cited herein, are hereby incorporated by reference as if set forth in their entirety herein.

The foreign and international patent publication applications, namely, Fed. Rep. of Germany Patent Application No. 196 12 490.5, filed on Mar. 29, 1996, and International Application No. PCT/DE97/00647, filed on Mar. 27, 1997, having inventors Manfred RINKLAKE and Norbert ROSLER, and International Publication No. WO 97/37387 published on Oct. 9, 1997, as well as their published equivalents, and other equivalents or corresponding applications, if any, in corresponding cases in Fed. Rep. of Germany and elsewhere, and the references cited in any of the documents cited herein, are hereby incorporated by reference as if set forth in their entirety herein.

The foreign and international patent publication applications, namely, Fed. Rep. of Germany Patent Application No. 196 12 488.3, filed on Mar. 29, 1996, and International Application No. PCT/DE97/00646, filed on Mar. 27, 1997, having inventors Manfred RINKLAKE and Norbert ROSLER, and International Publication No. WO 97/37091 published on Oct. 9, 1997, as well as their published equivalents, and other equivalents or corresponding applications, if any, in corresponding cases in Fed. Rep. of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. An energy collection system for a pitched roof, the roof being covered in part by a plurality of roofing plates, the roof having an upper ridge portion disposed adjacent the roof peak, and a lower eaves portion disposed below the roof peak, which ridge portion and eaves portion define a slope line in a ridge-eaves direction, said energy collection system comprising:

at least two energy collecting modules;

said at least two energy collecting modules each being disposed at least one of: substantially aligned with another one of said at least two energy collecting modules;

a plurality of joist elements configured and disposed to extend substantially in the ridge-eaves direction, and having a ridge-side end and an eaves-side end;

each of said joist elements being configured and disposed to support at least one of said at least two energy collecting modules;

at least one of said joist elements comprising a support structure; and said support structure being configured and disposed to support the eaves-side end of another of said joist elements disposed in the same slope line at a height above said one joist element that is at least equal to the thickness of one of said energy collecting modules so as to permit the movement and adjustment of said another joist element in the ridge-eaves direction over the said one module held by said one joist element.

2. The energy collection system according to claim 1; comprising:

at least one sub-roofing element having at least one raised bead which receives one of said joist elements;

said at least one sub-roofing element being disposed at least in part between one of said at least two energy collecting modules and a corresponding one of said joist elements;

said at least one sub-roofing element comprising a channel portion; and said at least one sub-roofing element being configured and disposed to permit said channel portion to be positioned beneath an edge extending in the ridge-eaves direction, of said one of said at least two energy collecting modules.

3. The energy collection system according to claim 2, in combination with a pitched roof having a plurality of roofing plates, wherein the roofing plates each have a length coverage dimension in the ridge-eaves direction, the length coverage dimension corresponding to the length of the roofing area actually covered by each roofing plate, and the roofing plates each having a width coverage dimension in a direction substantially transverse to said ridge-eaves direction, the width coverage dimension corresponding to the width of the roofing area actually covered by each roofing plate, and said collection system comprises:

each of said at least two energy collecting modules having a length dimension in the ridge-eaves direction and a width dimension in a direction substantially transverse to said ridge-eaves direction;

said length dimension of each of said at least two energy collecting modules being greater than the length coverage dimension of each of the roofing plates;

said width dimension of each of said at least two energy collecting modules being greater than the width coverage dimension of each of the roofing plates; and said width dimension of each of said at least two energy collecting modules being substantially equal to a whole-number multiple of the width coverage dimension of each of the roofing plates.

4. The energy collection system according to claim 3, wherein:

each said at least two energy collecting modules comprises a plurality of energy collecting cells;

said energy collecting cells are configured and disposed to cover an area of a top surface of each of said at least two energy collecting modules;

said area having a length dimension in the ridge-eaves direction;

said length dimension of said collecting cells being configured to be shorter than the shortest length coverage dimension of an adjacent roofing plate, to permit a ridge-side edge segment extending along the width dimension of each of said at least two energy collecting modules to be without cells.

5. An energy collection system as claimed in claim 4, wherein the roof has a substructure which defines a support plane for supporting said joist elements, at least a portion of said roofing plates comprise at least one of: a water channel and a cover channel, and wherein:

said roofing plates are substantially the same length as the energy collecting modules;

said plurality of joist elements each comprise an upper surface having a height dimension relative to the said support plane; and said relative height dimension is at least substantially equal to the height of a water channel of a laterally adjacent roofing plate, to permit a portion of a said module to be disposed to either: overlap a water channel of an adjacent roofing tile or align with a cover channel of an adjacent roofing plate.

6. An energy collection system according to claim 5, wherein said at least one support structure is disposed on said ridge-side end of said at least one joist element; and said at least one support structure extends from said upper surface of said at least one joist element.

7. An energy collection system according to claim 6, wherein:

at least one of said plurality of joist elements comprises a receptacle disposed on its eaves-side end;

said receptacle is configured for gripping an edge of one of said at least two energy collecting modules supported by said joist element;

said receptacle is disposed substantially opposite said at least one support structure, and defining a width dimension between an open edge of said receptacle and a facing portion of said support structure; and said defined width dimension is at least equal to the length dimension of a said energy collection module.

8. An energy collection system according to claim 7, wherein:

said joist elements each have a slot running along part of its underside in the ridge-eaves direction;

said at least one support structure comprises a coupling element;

said coupling element is configured in the form of a toggle-type end portion having side wings separated from the main part of the structure by slots which define a neck; and said toggle-type end portion is configured to be engaged in a corresponding underside of an overlying joist element with said neck located in said slot, to prevent the lifting-off of the overlying joist element.

9. An energy collection system according to claim 8, wherein said at least two energy collection modules are configured without frames.

10. An energy collection system according to claim 9, wherein:

said at least one sub-roofing element comprises a plurality of sub-roofing elements disposed to extend over the entire width of at least one of said at least two energy collection modules;

said sub-roofing elements each comprise an eaves-side edge configured to provide a seal against rain and snow;

said eaves-side edge is disposed in an overlapping area between two of said at least two energy collecting modules; and each of said plurality of sub-roofing elements comprises ventilation openings on its eaves-side edge, said ventilation openings including rows of baffles forming labyrinths.

11. An energy collection system as part of a pitched roof, the roof having a ridge portion and an eaves portion, which ridge portion and eaves portion define a slope line in a ridge-eaves direction, said energy collection system comprising:

a plurality of roofing plates;

at least two energy collecting modules;

said at least two energy collecting modules each being configured and disposed at least one of: substantially aligned with another one of said at least two collecting modules and immediately adjacent at least one of said roofing plates;

a plurality of joist elements disposed to extend substantially in the ridge-eaves direction;

at least one of said plurality of joist elements being configured and disposed to support each of said at least two energy collecting modules;

at least one of said joist elements having a support structure; and said support structure being configured and disposed to support an eaves-side end of said another joist element disposed in the same slope line at a height sufficient above said one joist element that at least equals the thickness of a first module supported by said one joist element to permit the movement and adjustment of said another of said supporting joist elements in the ridge-eaves direction over the top of said first module.

12. The energy collection system according to claim 11, comprising:
   at least one sub-roofing element having at least one raised bead which receives on of said joist elements;
   said at least one sub-roofing element being disposed at least in part between one of said at least two energy collecting modules and a corresponding one of said joist elements;
   said at least one sub-roofing element comprising a channel portion; and
   said at least one sub-roofing element being configured and disposed to permit said channel portion to be positioned beneath an edge extending in the ridge-eaves direction, of said one of said at least two energy collecting modules.

13. The energy collection system according to claim 12, wherein the roofing plates each have a length coverage dimension in the ridge-eaves direction, the length coverage dimension corresponding to the length of the roofing area actually covered by each roofing plate, and the roofing plates each having a width coverage dimension in a direction substantially transverse to said ridge-eaves direction, the width coverage dimension corresponding to the width of the roofing area the roofing area actually covered by each roofing plate, and said collection system comprises:
   each of said at least two energy collecting modules having a length dimension in the ridge-eaves direction and a width dimension in a direction substantially transverse to said ridge-eaves direction;
   said length dimension of each of said at least two energy collecting modules being greater than the length coverage dimension of each of the roofing plates;
   said width dimension of each of said at least two energy collecting modules being greater than the width coverage dimension of each of the roofing plates; and
   said width dimension of each of said at least two energy collecting modules being substantially equal to a whole-number multiple of the width coverage dimension of each of the roofing plates.

14. The energy collection system according to claim 13, wherein:
   each said at least two energy collecting modules comprises a plurality of energy collecting cells;
   said energy collecting cells being disposed to cover an area of a top surface of each of said at least two energy collecting modules;
   said area having a length dimension in the ridge-eaves direction;
   said length dimension of said collecting cells being configured to be shorter than the shortest length coverage dimension of an adjacent roofing plate, to permit a ridge-side edge segment extending along the width dimension of each of said at least two energy collecting modules to be without cells.

15. An energy collection system as claimed in claim 14, wherein the roof has a substructure which defines a support plane for supporting said joist elements, at least a portion of said roofing plates comprise at least one of: a water channel and a cover channel, and wherein:
   said roofing plates are substantially the same length as the energy collecting modules;
   said plurality of joist elements each comprise an upper surface having a height dimension relative to said support plane; and
   said relative height dimension is at least substantially equal to the height of a water channel of a laterally adjacent roofing tile, to pert a portion of a said energy collecting module to be disposed to either: overlap a water channel of an adjacent roofing tile or align with a cover channel of an adjacent roofing plate.

16. An energy collection system according to claim 15, wherein:
   said at least one support structure is disposed on said ridge-side end of said at least one joist element; and
   said at least one support structure extends from said upper surface of said at least one joist element.

17. An energy collection system according to claim 16, wherein:
   at least one of said plurality of joist elements comprises a receptacle disposed on its eaves-side end;
   said receptacle is configured for gripping an edge of one of said at least two energy collecting modules supported by said joist element;
   said receptacle is disposed substantially opposite said at least one support structure, and defines a width dimension between a an open edge of said receptacle and a facing portion of said support structure; and
   said defined width dimension is at least equal to the length dimension of a said energy collection module.

18. An energy collection system according to claim 17, wherein:
   said joist elements each have a slot running along part of its underside in the ridge-eaves direction;
   said at least one support structure comprises a coupling element;
   said coupling element is configured in the form of a toggle-type end portion having side wings separated from a main part of the structure by slots which define a neck; and
   said toggle-type end portion is configured to be engaged with a corresponding underside of an overlying joist element, with said neck located in said slot to prevent the lifting-off of the overlying joist element.

19. An energy collection system according to claim 18, wherein:
   said at least two energy collection modules are configured without frames;
   said at least one sub-roofing elements comprises a plurality of sub-roofing elements disposed to extend over the entire width of at least one of said at least two energy collection modules;
   said sub-roofing elements each comprise an eaves-side edge configured to provide a seal against rain and snow;
   each of said eaves-side edges is disposed in an overlapping area between two of said at least two energy collecting modules; and
   said plurality of sub-roofing elements each comprise ventilation openings on their eaves-side edges, said ventilation openings including rows of baffles forming labyrinths.

20. An energy collection system forming part of a pitched roof, the pitched roof defining a slope line in a ridge-eaves direction, the roof being covered in part with roofing plates, the roofing plates each having a coverage length and a system coverage width corresponding to the area of the roof covered by each plate, the energy collection system comprising:

a plurality of joist elements that can be laid in the ridge-eaves direction and can be laid so that they overlap in the ridge-eaves direction;

a plurality of plate-shaped modules that comprise cells are at least one of: butted up against one another, or are adjacent to neighboring roofing plates;

the modules each having a length in the ridge-eaves direction, the length being greater than the greatest coverage length of a roofing plate, and the width of which is greater than the coverage width of the roofing plate;

a support structure being disposed on each joist element, which, when two joist elements are located in the same slope line, supports the eaves-side end of the ridge-side joist element at a height above the surface of a first said module lying on top of the eaves-side joist element, so that the ridge-side joist element can be moved in the ridge-eaves direction over the first module;

wherein the width of a module is substantially equal to a whole-number multiple of the system coverage width of a roofing plate;

wherein in the ridge-eaves direction, the length of the area inside a module having cells is shorter than the shortest coverage length of neighboring roofing plate, so that, on the side nearer the ridge, a module has an edge segment that is free of cells;

wherein a sub-roofing element is laid on a joist element and underneath one of the modules; and said sub-roofing element having a water channel that can be positioned underneath an edge of the one module extending in the ridge-eaves direction.

21. The energy collection system according to claim 1, wherein said at least two energy collecting modules comprise photovoltaic modules.

22. The energy collection system according to claim 11, wherein said at least two energy collecting modules comprise photovoltaic modules.

23. The energy collecting system according to claim 20, wherein said at least two energy collecting modules comprise photovoltaic modules.

* * * * *

UNITED STATES PATENT AND TRADEMARK OFFICE
CERTIFICATE OF CORRECTION

PATENT NO.    : 6,119,415
DATED         : September 19, 2000
INVENTOR(S)   : Manfred Rinklake and Norbert Rösler It is certified that error appears in the above-identified patent and that said Letters Patent is hereby corrected as shown below:

Column 5,
Line 27, after "view" insert -- partly sectioned --.
Line 43, after "1X-1X;", delete "and".
Line 56, after "with", delete "A" and insert -- a --.

Column 12,
Line 19, after "similar", delete "toga" and insert -- to a --.

Column 13,
Line 22, after "and", delete "28" and insert -- 28' --.
Line 23, after "element", delete "28" and insert -- 28' --.
Line 29, after "element", delete "28." and insert -- 28'. --.
Line 30, after "28,", delete "110" and insert -- 28' --.
Line 33, after "element", delete "28," and insert -- 28', --.
Lines 39, 42, 49, 52 and 62, after "element", delete "28" and insert -- 28' --.
Line 56, after "28,", delete "28" and insert -- 28' --.

Column 14,
Line 1, after "element", delete "10" and insert -- 28 --.
Line 25, after "receptacle", delete "20" and insert -- 120 --.
Line 37, delete "42." and insert -- 62. --.
Line 43, after "element", delete "10" and insert -- 28 --.

Column 16,
Line 6, under "U.S. Pat. No.", delete "549413" and insert
-- 5449413 --.
Line 6, under "Title", delete "reflect-" and insert -- reflecting --.
Line 7, under "Assignee", before "Lab.,", delete "ing".
Line 12, under "Title", after "Series", delete "in-".
Line 18, before "Research", delete "Midwet" and insert -- Midwest --.

Column 17,
Line 7, delete "547848" and insert -- 5477848 --.
Line 10, delete "5477848" and insert -- 5388567 --.

UNITED STATES PATENT AND TRADEMARK OFFICE
CERTIFICATE OF CORRECTION

PATENT NO.     : 6,119,415
DATED          : September 19, 2000
INVENTOR(S)    : Manfred Rinklake and Norbert Rösler It is certified that error appears in the above-identified patent and that said Letters Patent is hereby corrected as shown below:

<u>Column 22,</u>
Line 3, after "to", delete "pert" and insert -- permit --.

Signed and Sealed this

Nineteenth Day of November, 2002

*Attest:*

*Attesting Officer*

JAMES E. ROGAN
*Director of the United States Patent and Trademark Office*